June 28, 1966   S. AXELROD ET AL   3,257,948
CONSUMABLE ARTILLERY COMPONENTS
Filed Aug. 23, 1963
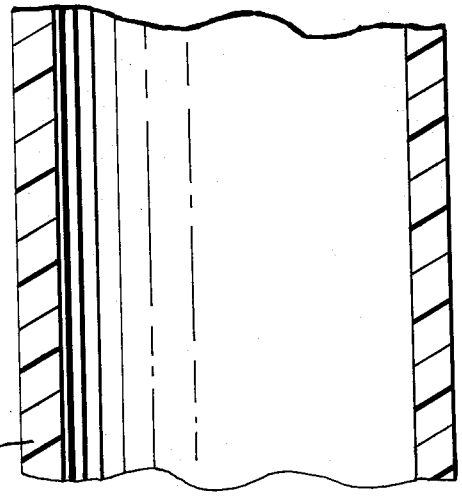
INVENTORS
SYDNEY AXELROD
VLADIMIR MIRKO
BY Harry M. Saragovitz,
Edward J. Kelly &
A. J. Dupont     ATTORNEYS United States Patent Office
3,257,948
Patented June 28, 1966

3,257,948
CONSUMABLE ARTILLERY COMPONENTS
Sydney Axelrod, New York, and Vladimir Mirko, Brooklyn, N.Y., assignors to the United States of America as represented by the Secretary of the Army
Filed Aug. 23, 1963, Ser. No. 304,744
8 Claims. (Cl. 102—43)

The invention described herein may be manufactured and used by or for the Government for governmental purposes, without the payment to us of any royalty thereon.

This invention relates to an improvement in the manufacture of consumable cartridge cases, flash tubes, primer bodies, and other artillery components. These novel components possess the necessary physical properties of strength, rigidity, toughness, and the like, and in addition, are completely burned and leave no residue upon firing.

The advantages of consumable cartridge cases and their manufacture from nitrocellulose compositions are well known in the art. However, the use of highly inflammable or explosive materials for shell cases introduces an additional hazardous element into the manufacture and handling of completed shells. Moreover, cellulose nitrate does not possess desirable mechanical characteristics for many purposes and is also susceptible to water absorption without a protective coating.

It is therefore the object of this invention to provide consumable cartridge components having advantageous mechanical and physical characteristics. It is an additional object of this invention to provide consumable cartridge cases which are not highly inflammable under ordinary conditions.

The foregoing objects as well as others are achieved in accordance with this invention by the novel use of foamed thermosetting resins for the fabrication of consumable artillery components.

In the appended drawing is shown a longitudinal section with the ends broken away of a consumable shell casing of foam thermosetting resin having a cellular structure that is completely combustible leaving no ash or residue when the cartridge is fired. The casing is not only combustible but also burns with the charge that may be within the casing and is completely consumed. The plasticity of the material readily permits the casing to be molded to any desired shape.

The utility of these thermosetting foams as consumable artillery items is due to the cellular structure of these compositons. Due to the rapidity of combustion of propellant compositons, inert components often do not have time to be completely burned and leave a residue which is undesirable and which may be detrimental to the satisfactory functioning of the item. This incomplete burning is due to the lack of sufficient burning surface. However, the foam structure is readily consumed by the combustion because the cellular structure increases the total surface area and decreases the mass. This burning is characteristic of rigid foams but not of flexible or semi-flexible foams which soften or melt and do not have the required burning characteristics. It has been found that the cellular structure of the foam is of considerably greater significance for complete combustion than the chemical composition. In addition, the rigidity of the foam gives the items structural strength.

These rigid cellular structures are formed by mixing two or more ingredients resulting in a mass which is poured, injected or otherwise introduced into a mold cavity. The reaction between the ingredients in the mix is completed in the mold cavity and may require heating from an outside source in order to go to completion, depending upon the specific resin system used. Since the foaming resins readily flow into and fill cavities, there is no limitation to the shapes obtainable except for the practical problem of mold assembly or disassembly. Items such as consumable cartridge cases, consumable flash tubes, and consumable primer bodies have been formed and tested and found to function satisfactorily. Such rigid foamed components leave no residue and are smokeless.

Resinous materials suitable for the construction of these components must be rigid as well as impact and tear resistant when cured. It is of importance that the porous structures consist of small, uniform, non-connected cells.

The thermosetting resins which can form satisfactory cellular masses include the polyurethane, epoxy, phenolic, and other resin types. The gas for foaming may be produced by the addition of blowing agents, that is, compounds which will form a gas at the temperature of the curing reaction either by decomposition or by vaporization. In the case of polyurethanes and polyisocyanate modified resins, the gas for foaming may be produced by the addition of an excess of polyisocyanate and water. The reaction produces carbon dioxide as well as active hydrogen compounds which further react and cross-link with the resin ingredients to aid in its cure.

In order to produce foamed resins having small, non-connected cells, it is necessary to trap the gas producing the foam at a great number of points. The use of viscous reacting masses helps prevent the loss of coalescence of gas bubbles and with the additional use of foam stabilizers, a more precise control of cell size can be obtained. Resin prepolymers having a branched structure or containing aromatic nuclei are also used with advantage. Ingredients for the formation of these prepolymers which are of especial use in this invention have the generalized structural formula

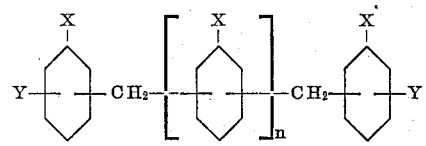

in the following cases: (1) where X is —OH and Y is —CH$_2$OH, i.e., the novolacs; (2) where X is

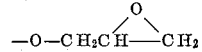

and Y is

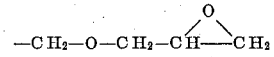

i.e., the reaction product of the novolacs with epichlorohydrins; and (3) where X is —NCO and Y is H, i.e., polymethylene polyphenyl isocyanates.

Polyurethane resin foams useful to this invention are produced by the reaction of polyesters or polyethers with a polyisocyanate and the further reaction with a curing agent containing a source of water and an amine type catalyst. The polyesters and polyethers used are of the type that terminate with hydroxyl groups. They react with an excess of the polyisocyanate to produce an isocyanate group terminated prepolymer. Further polymerization and cross-linking is effected with the aid of water and the catalyst. The water reacts with the terminal —NCO groups to not only cross-link but also to produce carbon dioxide gas at a rate controlled by the catalyst. As the polymerization proceeds the viscosity increases and the resin expands due to the formation and entrapment of the carbon dioxide gas. The reaction is exothermic and the heat liberated aids in curing the foam.

The curing agent consists of a mixture of 40–60% of a salt containing chemically bound water, 20–30% of a tertiary amine, 10–15% of a surfactant and 10–15% of a silicone oil. The salt containing chemically bound water may be sodium acetate trihydrate, sodium dihydrogen orthophosphate monohydrate, cadmium acetate trihydrate or other hydrate salt which will decompose within the temperature range used to cure the polyurethane foam resin. Tertiary amines suitable for use include pyridine, 2-dimethylaminoethanol, N-methylmorpholine, triethylamine, and others. The surfactant used may be an ethylene oxide condensate with fatty acids, such as oleic and stearic, or with the amides of such acids. The polyoxyethylene sorbintan esters, e.g., polyoxyethylene sorbitan monopalmitate, polyoxyethylene sorbitan monooleate, are also useful surfactants. The silicone oil is preferably a dimethyl siloxane polymer.

The polyethers and polyesters useful in producing polyurethane foams are viscous liquids. Suitable polyethers include polyoxyalkylene glycols such as polyethylene glycol, polypropylene glycol, and others. Suitable polyesters can be prepared by reacting dicarboxylic acids such as adipic, sebacic, succinic, and phthalic acid with an excess of a glycol selected from the lower members of the homologous series, for example ethylene glycol, propylene glycol, and butylene glycol. Useful polyisocyanates include, among others, the following: diphenylmethane-4,4'-diisocyanate, diphenyl-4,4'-diisocyanate, diphenyl-3,3'-dimethoxy-4,4'-diisocyanate, naphthalene-1,5-diisocyanate, naphthalene-1,8-diisocyanate, naphthalene-2,7-diisocyanate, as well as a polymethylene polyphenyl isocyanate according to the previously given generalized structural formula in which the "$n$ value" is predominantly 1.

Epoxy foamed resins may be produced by mixing polyglycidyl ethers with a hardener and a blowing agent. The hardener acts to cross-link the glycidyl chains and to produce a three dimensional resin. The blowing agent decomposes upon heating to release an inert gas, e.g., nitrogen or carbon dioxide. The cross-linking is exothermic and the heat liberated aids in further curing the resin as well as in decomposing the blowing agent to release the gas which causes the resin hardener mixture to foam as the ingredients react. Post curing requires additional heating.

The hardeners or cross-linking agents for the epoxy resins include dibasic acids and their anhydrides, for example succinic and phthalic acids and their anhydrides, and diamines, for example, ethylenediamine, diethylenetriamine, triethylenetetramine, meta-phenylenediamine, diaminophenylsulfone, and others. The hardeners may contain, in addition, a tertiary amine such as triethylamine or 2-dimethylaminoethanol, to act as a catalyst for the cross-linking reaction. Suitable blowing agents for epoxy foamed resin include sodium bicarbonate, ammonium carbonate, dinitrosopentamethylenetetramine, and N,N'-dimethyl-N,N'-dinitrosoterephthalamide. Suitable glycidyl ethers can be prepared by the action of epichlorohydrin on polyhydric phenols such as resorcinol, novolac resins, bis(p-hydroxyphenyl) methane, 2,2-bis(p-hydroxyphenyl) propane, and other bisphenols.

Phenolic foamed resins are produced by curing a partially reacted aqueous reaction product of a phenol and an aldehyde in the presence of a readily volatile substance which evaporates at the curing temperature of the phenolic resin. The curing reaction is exothermic and the heat thus liberated aids in the further curing of the foam and also the production of gas, through volitalization, causing the curing resin to foam.

Acid catalysts used for curing may be phenol sulfonic acid, benzene sulfonic acid or concentrated sulfuric acid. The fugacious material used as a blowing agent may be for example, diethyl ether, cyclohexane, and other hydrocarbons such as hexane, heptane, or octane. The aqueous reaction product of a phenol and an aldehyde is prepared by reacting at least one mole of a phenolic compound, such as phenol itself, cresol, xylenol, and resorcinol with an excess of aqueous aldehyde such as formaldehyde, acetaldehyde, and furfuraldehyde, in the presence of an alkaline catalyst, such as sodium or potassium hydroxide, sodium bicarbonate, and other basic materials, and finally removing most of the excess water under vacuum.

In the preparation of the foamed resins used in this invention, the ingredients may be mixed simply by pouring one into the other and stirring thoroughly either by hand or mechanically. There is no preferred rate of addition. The mixtures of resin and other ingredients (e.g., blowing agent, hardeners) must be poured into the molds immediately. Control of the foaming and the size of the voids in the product is predetermined by controlling the starting materials used and the curing and foaming conditions which are known to those skilled in the art. Many of the resins may be prepared by mixing components commercially available in unit packages. Otherwise the curing or hardening optimum foaming conditions must be determined for each composition.

In all cases, the molds must be coated with a mold release agent. A variety of release agents may be used, including Teflon spray, polyvinyl alcohol spray, silicone oil spray, silicone grease, and others.

Below are given several illustrative examples showing typical methods of carrying the present invention into practice.

*Example I*

280 grams of pourable polyethylene glycol adipate are mixed with 18 grams of a curing agent consisting of ingredients, in parts by weight, as follows: 10% dimethyl siloxane having a viscosity of 100 centistokes at 100° F., 25% triethylamine, 55% sodium acetate trihydrate, and 10% polyethylene sorbitan palmitate. This mixture is poured with stirring into 400 grams of polymethylene polyphenyl isocyanate having a molecular weight not in excess of 400 and corresponding to the previously given structural formula wherein the "$n$ value" is predominantly 1. The resulting mixture is poured immediately into a mold previously treated with silicone grease and preheated to about 125° F. It is simultaneously foamed and cured by heating in the mold at about 165° F. for one hour and is then post cured for an additional hour at 400° F. The mold is then cooled to room temperature and the cured resin removed.

The above amounts of ingredients are sufficient for a 90 mm. cartridge case having a wall thickness of ¼ inch, a length of 20.5 inches and a diameter of 4.5 inches at the base and 3.5 inches at the mouth.

*Example II*

100 grams of a diglycidyl ether corresponding to the formula

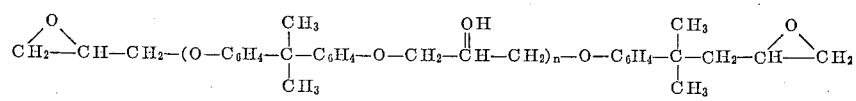

wherein $n$ is zero in the case of at least 75% of the molecules and one for the remainder, are mixed with 12 grams of diethylenetriamine and 10 grams of N,N'-dimethyl-N,N'-dinitrosoterephthalamide. The mixture is introduced into a flash tube mold, previously coated with silicone grease, having dimensions as follows: length, 17 inches; inside diameter, 1.1 inches, and outside diameter, 1.58 inches. The resin is cured in the mold at a temperature of 350° F. for one half hour, at the end of which time the mold is cooled to room temperature and the resin removed.

The epoxy resin is a hard, rigid structure which completely fills the mold.

*Example III*

A liquid resinous reaction product of phenol and formaldehyde is prepared by mixing ingredients in the ratio of 94 grams phenol, 75 grams of 40% aqueous formaldehyde, and 1½ grams sodium hydroxide for 3 hours and heating for 3 hours at a temperature of 175° F., cooling and acidifying to a pH of 6 with sulfuric acid and partially dehydrating the product to a water content of approximately 15% by continued heating at 175° F. under a pressure of 35 cm. Hg for a period of one half hour, and finally cooling to room temperature. 70 grams of this resinous product is mixed with 22 grams of ethyl ether and then 8 grams of concentrated sulfuric acid. The mixture is stirred and quickly poured into a flash tube mold, previously coated with silicone grease and having dimensions as follows: length, 17 inches; inside diameter, 1.1 inches, and outside diameter, 1.58 inches. The heat generated is sufficient to simultaneously foam and cure the phenolic resin. The mold is allowed to remain at room temperature for an additional hour after cooling to ambient temperature and then the molded resin removed.

As in the case of the other resinous materials, the foam completely fills the mold and sets to a hard, rigid material.

The plastic structures found most desirable and obtained by the ingredients and foaming conditions delineated in the examples above are porous and consist largely, that is to the extent of at least 75%, of closed non-connected cells. The largest cells are 0.03 inch in diameter and approximately 85–95% of the cells are 0.003 inch in diameter or smaller.

Firing tests of the 175 mm. Gun M113, using a rigid polyurethane flash tube and the M6 Propellant Charge (composition: nitrocellulose (containing 13.15 percent N)—86.1%, dinitrotoluene—9.9%, dibutylphthalate—3.0%, and diphenylamine—1.0%) gave satisfactory ballistic results without any residue remaining from the polyurethane tube. Previously, paper tubes had been used and had left residue in the gun. Firing tests with the 90 mm. Gun M41 using a rigid polyurethane cartridge case to replace the T24B1 cartridge case gave the following comparative results using the same propellant charge for each cartridge case:

*Table I*

BALLISTIC EFFECT OF FOAMED POLYURETHANE CARTRIDGE CASE

| Cartridge Case | Propellant Charge (M6), ozs. | Velocity (f.p.s.) | Pressure (Cu. p.s.i.) |
|---|---|---|---|
| T24B1 | 85.34 | 2,160 | 23,400 |
| Polyurethane foam | 85.34 | 2,133 | 23,500 |

The consumable foamed plastic cartridge cases of this invention are all highly cross-linked materials not significantly affected by temperature extremes and should function satisfactorily under both tropical and arctic conditions. The dimensional changes with absorption of water vapor from the atmosphere is not such as to affect the chambering of cartridge cases in a gun. The plastics are all compatible with and not noticeably affected by nitroglycerine and other propellant components.

Having described the invention what is claimed and desired to be secured by Letters Patent is:

1. A consumable shell casing for artillery ammunition in which the consumable shell casing comprises a rigid, cross-linked, thermosetting resin having a cellular structure.

2. A consumable shell casing according to claim 1 wherein the said casing is a cartridge case.

3. A consumable shell casing according to claim 1 wherein the said casing is a flash tube.

4. A consumable shell casing according to claim 1 wherein the thermosetting resin is a polyurethane plastic.

5. A consumable shell casing according to claim 1 wherein the thermosetting resin is an epoxy plastic.

6. A consumable shell casing according to claim 1 wherein the thermosetting resin is a phenol-formaldehyde plastic.

7. A consumable shell casing for artillery ammunition in which the consumable shell casing comprises a rigid, cross-linked, thermosetting resin having a cellular structure and consisting predominantly of closed nonconnected cells, the said cells having a maximum size of 0.03 inch in diameter and at least 85% of the said cells having a maximum diameter of 0.003 inch.

8. A consumable shell casing for artillery ammunition in which the casing comprises a molded shell consisting of a rigid, cross-linked thermosetting resin having a cellular structure with unconnected cells.

References Cited by the Examiner

UNITED STATES PATENTS

| | | | |
|---|---|---|---|
| 664,116 | 12/1900 | Barrallon | 102—40 |
| 2,632,391 | 3/1953 | Kintzinger | 102—43 |
| 2,831,820 | 4/1958 | Aase et al. | 260—2.5 |
| 2,979,469 | 4/1961 | Shannon et al. | 260—2.5 |
| 3,027,286 | 3/1962 | Kurhan | 206—46 |
| 3,051,665 | 8/1962 | Wismer et al. | 260—2.5 |
| 3,075,926 | 1/1963 | Stewart et al. | 206—46 |
| 3,084,824 | 4/1963 | Kuzma et al. | 206—46 |
| 3,085,896 | 4/1963 | Britt et al. | 260—2.5 |
| 3,093,600 | 6/1963 | Spencer et al. | 260—2.5 |
| 3,095,813 | 7/1963 | Lipinski | 102—43 |
| 3,098,444 | 7/1963 | Walkey et al. | 102—43 |

OTHER REFERENCES

Scientific American, September 1947, pp. 119–121, "Expanding Fields for Expanded Plastics," by Charles A. Breskin.

BENJAMIN A. BORCHELT, *Primary Examiner.*

SAMUEL FEINBERG, *Examiner.*

R. F. STAHL, *Assistant Examiner.*